UNITED STATES PATENT OFFICE.

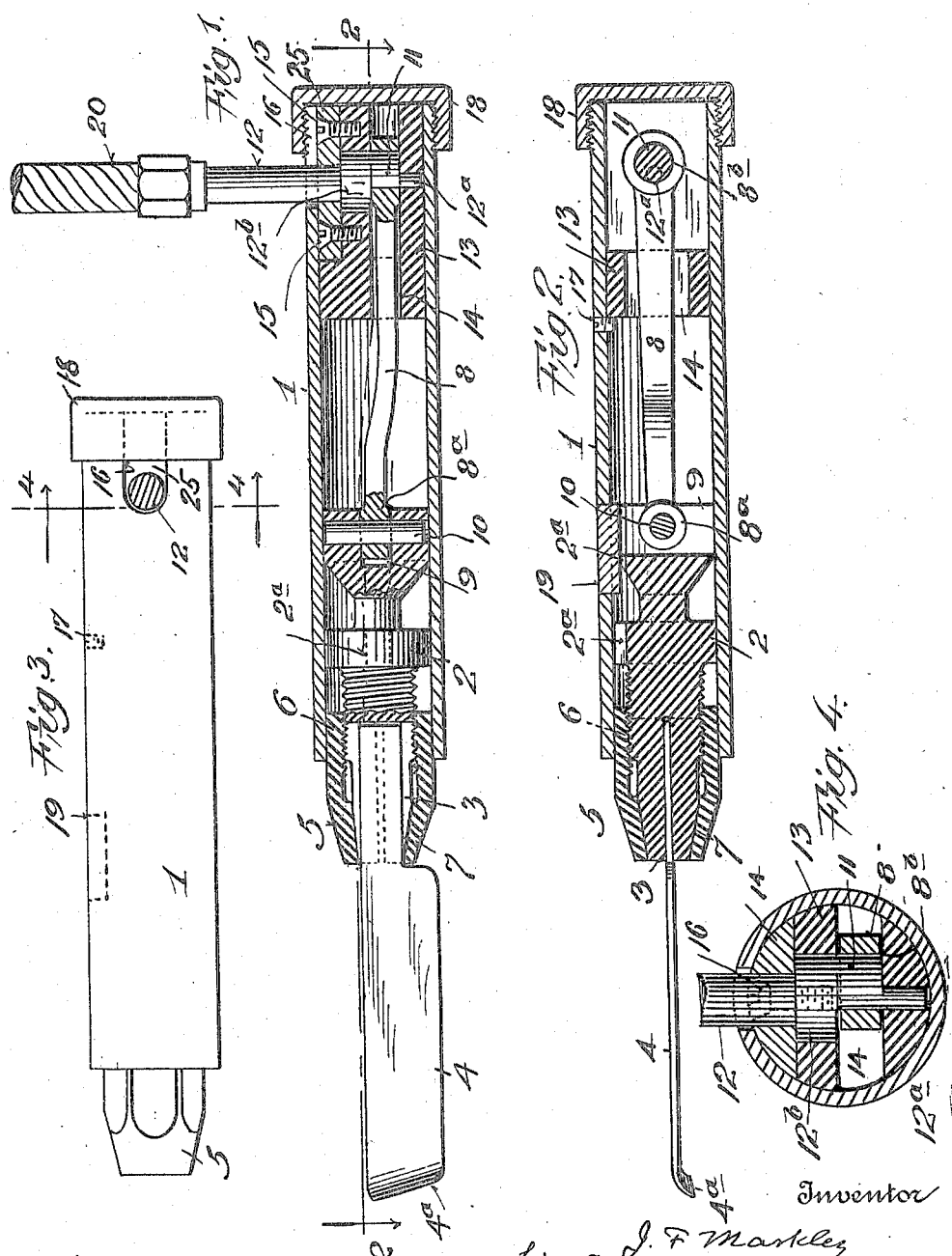

JOSEPH FOLWELL MARKLEY, OF CALDWELL, NEW JERSEY.

IMPLEMENT FOR TRIMMING BOOTS AND SHOES.

1,283,847.  Specification of Letters Patent.  Patented Nov. 5, 1918.

Application filed July 11, 1916. Serial No. 108,592.

*To all whom it may concern:*

Be it known that I, JOSEPH FOLWELL MARKLEY, a citizen of the United States, and resident of Caldwell, in the county of Essex and State of New Jersey, have invented certain new and useful Improvements in Implements for Trimming Boots and Shoes, of which the following is a specification.

The object of this invention is to provide a simple, efficient and cheap implement having means to hold a suitable knife blade or cutter, and comprising means to reciprocate said blade or cutter, whereby the implement may be held in the hand and guided to the work while the blade or cutter is reciprocated. My improvements are particularly adapted for use in removing surplus heel stock, or for jointing the shank, of boots, shoes, sandals and slippers, as well as for skiving leather (or its substitute) or trimming stock in manufacturing or repairing boots, shoes and the like.

This invention comprises novel details of improvement and combinations of parts that will be more fully hereinafter set forth and then pointed out in the claim.

Reference is to be had to the accompanying drawings forming part hereof, wherein, Figure 1 is a longitudinal section of an implement embodying this invention;

Fig. 2 is a section substantially on the line 2, 2, in Fig. 1;

Fig. 3 is a side view of the implement, and

Fig. 4 is a section on the line 4, 4, in Fig. 3.

The numeral 1 indicates a casing, shown in the form of a tube adapted to be supported in the hand of the operator, and at 2 is a head adapted to reciprocate in the bore of the casing. Said head at its outer end is provided with tool holding means. I have shown the outer end of said head as split or slotted at 3 to receive the tang or shank of a suitable knife-blade or cutter 4. At 5 is a clutch member shown in tubular form and internally threaded to receive threads 6 of head 2. The outer end of head 2 and the corresponding inner end of member 5 are shown tapering at 7, whereby when said member is screwed upon head 2 said member will force the jaws of said head upon the tang or shank of the blade or cutter for gripping the latter in the nature of a chuck. The head 5 is properly shaped to reciprocate within the bore of casing 1 with head 2, and whereby the blade or cutter is guided. At 8 is a reciprocative rod pivotally connected with head 2. The apertured end $8^a$ of rod 8 is shown received in the jaws or fork 9 in the adjacent end of head 2, a pin 10 located in a bore in said jaws and in the aperture of said rod pivotally connecting the rod with said head, whereby the rod may reciprocate within the casing. The opposite end of said rod is shown provided with an opening $8^b$ receiving crank-disk 11 on a shaft 12. Said shaft is journaled in a block 13 located within casing or tubing 1. Block 13 is provided with a longitudinally disposed slot or recess 14 in which rod 8 is adapted to operate. Shaft 12 is shown journaled in block 13, for which purpose the end of the shaft is shown provided with a pintle $12^a$ rotative in a bearing or bore in one side of block 13 and with an annular bearing portion $12^b$ journaled in a bearing in the opposite side of block 13, the crank-disk being between pintle $12^a$ and bearing $12^b$, whereby said shaft is guided for rotation in said block. To retain the shaft in block 13, a plate 25 is shown having a hole in which the shaft rotates, which plate is shown secured to the block by screws 15. Bearing $12^b$ is shown of greater diameter than shaft 12 whereby plate 25, by being located over bearing $12^b$ retains the latter and the shaft in operative position in the block. Casing or tube 1 is shown provided with a slot 16 leading to the edge of the casing to receive shaft 12. At 17 the casing is shown provided with a stop at one end of block 13 and at 18 is a cap screwed on the end of the casing at the opposite end of the block. Block 13 is retained in proper position in the casing between stop 17 and cap 18. At 19 is a key secured to casing or tube 1 and extending into the bore of the latter, which key enters a groove $2^a$ in the adjacent part of head 2, whereby the latter is guided to reciprocate and kept from rotation within said head.

The arrangement described is such that when the head 2 is connected to rod 8, and the latter and shaft 12 are connected to block 13, chuck member 5 not being in position, the said parts may be pushed into the casing, as from the right-hand end of Fig. 1, the groove $2^a$ of said head receiving stop 17 as the head 2 slides in the casing, the groove $2^a$ finally receiving the key 19, the shaft 12 sliding in slot 16. Thereupon cap 18 may be applied to retain the parts in position, and the chuck member 5 may be screwed upon head 2 (Fig. 1). Shaft 12 may be connected to any suitable motive power, such as to a suitable motor by means of a flexible shaft 20. When the blade or cutter 4 is secured to head 2, the operator may manipulate the implement in any desired manner to enable him to present the cutting edge of the blade or cutter to the work, as in the manner he would do with an ordinary knife blade. The rotation of shaft 12 causes rapid reciprocation of the blade or cutter, and during such reciprocations of the latter it may be guided to cut the stock or material operated on much more rapidly than the operator could do with an ordinary blade operated by hand. The form of blade or cutter shown has a bent end at 4ª adapted to work upon shoe heels and shanks. Since the head 2 and the blade or cutter are kept from rotation during reciprocation the blade or cutter may be applied, as desired, to the work with accuracy and despatch.

A particular feature of this invention resides in its applicability to jointing the shanks of boots, shoes, sandals and slippers to the heel for removing surplus heel stock at such joint. For such work the operator may guide the implement so that the cutting edge will be rapidly reciprocated to cut out and shape the heel at such joint, since he is enabled, by the ease with which the implement may be handled, to follow the contour of the heel accurately and expeditiously with the cutting edge of the blade or cutter.

Changes may be made in the details and arrangement of parts set forth, as the same may be varied, within the scope of the appended claim, without departing from the spirit of the invention.

Having now described my invention what I claim is:—

An implement of the class described comprising a casing, a head reciprocative within the casing, tool holding means upon the head, a rod pivotally connected with the head, a block within the casing having a recess receiving the rod, a crank-disk within said recess coöperative with said rod, a shaft carrying said crank-disk, said shaft having a pintle journaled in the block, and a plate secured upon the block and having a bore receiving the shaft, said plate being coactive with said bearing of the shaft to retain the latter rotatively in the block.

Signed at Asbury Park, in the county of Monmouth and State of New Jersey this first day of July, A. D. 1916.

JOSEPH FOLWELL MARKLEY.

Witnesses:
WINFIELD H. STEPHENS,
HARRY M. WILSON.

Copies of this patent may be obtained for five cents each, by addressing the "Commissioner of Patents, Washington, D. C."